United States Patent [19]
Park

[11] Patent Number: 5,939,714
[45] Date of Patent: Aug. 17, 1999

[54] TRACKING ERROR DETECTOR EMPLOYING PHASE DIFFERENCE DETECTION METHOD

[75] Inventor: Sung Cheol Park, Ichon-shi, Rep. of Korea

[73] Assignee: Hyundai Electronics Industries Co., Ltd., Kyoungki-do, Rep. of Korea

[21] Appl. No.: 08/938,056

[22] Filed: Sep. 26, 1997

[30]    Foreign Application Priority Data

Oct. 25, 1996 [KR] Rep. of Korea ....................... 96-48274

[51] Int. Cl.⁶ ....................................................... G11B 7/00
[52] U.S. Cl. .................................. 250/231.16; 250/201.5; 369/44.32; 369/44.41
[58] Field of Search ........................... 250/231.16, 201.5, 250/214 R; 369/44.25, 44.26, 44.28, 44.32, 44.34, 44.35, 44.41, 44.42

[56]           References Cited

U.S. PATENT DOCUMENTS

| | | |
|---|---|---|
| 4,754,129 | 6/1988 | Koh . |
| 4,839,876 | 6/1989 | Fennema . |
| 5,050,146 | 9/1991 | Richgels et al. . |
| 5,090,002 | 2/1992 | Chow et al. . |
| 5,101,390 | 3/1992 | Kuwabara . |
| 5,144,605 | 9/1992 | Kobayashi et al. . |
| 5,351,223 | 9/1994 | Park . |
| 5,859,816 | 1/1999 | Yamamoto ........................... 369/44.25 |

*Primary Examiner*—Edward P. Westin
*Assistant Examiner*—Kevin Pyo
*Attorney, Agent, or Firm*—Merchant, Gould, Smith, Edell, Welter & Schmidt

[57]            ABSTRACT

A tracking error detector employing a phase difference detection method, comprising a photo detector for generating four divided signals, a first adder for adding two of the four divided signals from the photo detector, a second adder for adding the remaining two signals from the photo detector, first and second comparators for comparing output voltages from the first and second adders with a reference voltage, respectively, a first D flip-flop for providing first and second output signals synchronously with first and second output signals from the first comparator, a first OR gate for ORing the first and second output signals from the first D flip-flop, a second D flip-flop for providing first and second output signals synchronously with first and second output signals from the second comparator, a second OR gate for ORing the first and second output signals from the second D flip-flop, a third OR gate for ORing output signals from the first and second OR gates, a buffer for transferring the output signal from the first OR gate to its output terminal in response to an output signal from the third OR gate, an integrator for integrating a voltage signal from the buffer, a first switch being turned on in response to a DVD selection signal, and a second switch being turned on in response to a CD selection signal.

5 Claims, 3 Drawing Sheets

3a: first adder output
3b: second adder output
3c: first comparator Q
3d: second comparator Q
3e: first comparator /Q
3f: second comparator /Q
3g: D-F/F1 Q1
3h: D-F/F1 Q2
3i: D-F/F2 Q1
3j: D-F/F2 Q2
3k: first OR gate output
3l: second OR gate output
3m: third OR gate output
3n: buffer Y
3o: integrator output

TRACKING ERROR DETECTOR EMPLOYING PHASE DIFFERENCE DETECTION METHOD

BACKGROUND OF THE INVENTION

1. Field of the Invention

The present invention relates in general to a tracking servo system of a compact disk or digital video disk in a compact disk player (referred to hereinafter as CDP) or digital video disk player (referred to hereinafter as DVDP), and more particularly to a tracking error detector employing a phase difference detection method, in which a tracking error of the DVD is detected on the basis of the phase difference detection method.

2. Description of the Prior Art

Recently, the social structure has been developed according to a high-level information technique. For example, a video cassette recorder (VCR) or audio system has been used to reproduce video or audio data using a video or audio tape as auxiliary storage means. However, recently, for the purpose of providing video and audio of larger amount and higher definition, a DVDP or CDP is actively used to reproduce video or audio data using a DVD or CD as auxiliary storage means of small size and large capacity.

FIG. 1 is a functional block diagram illustrating the construction of a general CDP or DVDP. As shown in this drawing, the CDP or DVDP comprises a CD or DVD 1 which is auxiliary storage means for storing data of contents desired by the user, a spindle motor 2 for rotating the CD or DVD 1 at a constant speed, a pick-up 3 for scanning a laser beam on the disk 1 to read data recorded thereon, a sled motor 4 for moving the pick-up 3 vertically with respect to a rotating direction of the disk 1, a high-frequency amplifier 5 for amplifying a laser signal detected by the pick-up 3, a servo processor 6 for analyzing an output signal from the high-frequency amplifier 5 to discriminate whether the pick-up 3 accurately traces a track of the disk 1, and a digital signal processor 7 for converting the output signal from the high-frequency amplifier 5 into data processible in an application logic block and outputting the converted data to the servo processor 6. The digital signal processor 7 also outputs desired data to a speaker.

The CDP or DVDP further comprises a driver 8 for controlling speeds of the spindle and sled motors 2 and 4 in response to disk track data from the servo processor 6 and digital signal processor 7, and a microprocessor 9 for controlling the entire operation of the CDP or DVDP.

The operation of the CDP or DVDP with the above-mentioned construction will hereinafter be described.

When the disk 1 is rotated at a constant speed by the spindle motor 2, infrared rays are emitted and reflected on the surface of the disk 1 and current based on the reflected amount is read by the pick-up 3. The read current from the pick-up 3 is amplified by the high-frequency amplifier 5 and then applied to the servo processor 6. The servo processor 6 analyzes the output signal from the high-frequency amplifier 5 to discriminate whether the pick-up 3 accurately traces the track of the disk 1. The driver 8 controls the motor speed in accordance with the result discriminated by the servo processor 6. The output signal from the high-frequency amplifier 5 is also applied to the digital signal processor 7, so that it can be converted into data processible in the application logic block. The driver 8 controls the spindle motor 2 in response to output data from the digital signal processor 7. The above operation is controlled by the microprocessor 9.

Noticeably, in an apparatus capable of reproducing both the DVD and CD, a grating lens (not shown) in the pick-up 3 must be adjusted according to a track pitch of the inserted disk to detect a tracking error. At this time, once the grating lens is fixed, only the disk of one type can be reproduced, which is called a 3-beam method. For this reason, it is impossible to perform the tracking servo operation by detecting tracking errors of the CD and DVD with different track pitches in the same manner.

On the other hand, a grating adjustment apparatus of a 3-beam type optical pick-up is disclosed in U.S. Pat. No. 4,754,129, filed in the name of Samsung Electronics Co. Ltd, Rep. of Korea. The grating adjustment apparatus is used in assembling of the 3-beam type optical pick-up, for automatically and readily adjusting a grating angle to obtain a tracking error signal which is larger than target values of sub-laser beams scanned on the same track of a CD. The maximum value can automatically be adjusted within the range of a tracking error, which is detected on the basis of the grating adjustment by an indicator. The grating adjustment apparatus comprises transducing amplifiers for converting sub-beam current signals from the optical pick-up into voltage signals, a differential amplifier for performing a differential amplification operation with output signals from the transducing amplifiers, a band pass filter for removing a noise from an output signal from the differential amplifier, a low frequency lag compensator for doing lead compensation for a high frequency of an output signal from the band pass filter and restricting a bandwidth of an open loop gain of the apparatus, a differentiator for generating a derivative variable of an output signal from the low frequency lag compensator, a discriminator for discriminating the level of an output signal from the differentiator, a system controller for controlling the system operation in response to an output signal from the discriminator, a motor driving stage for driving a motor under the control of the system controller, a jig actuator for actuating a jig according to a rotational torque of the motor, and an indicator for indicating a system state under the control of the system controller.

In particular, the grating adjustment apparatus is adapted to automatically adjust the grating angle to obtain a target value of the tracking error signal. The grating angle is adjusted on the basis of the tracking error signal detected by the discriminator in such a manner that the target value of the tracking error signal can be maintained to drive the motor. However, the above-mentioned grating adjustment apparatus is limited to the function of merely detecting and maintaining the tracking error.

SUMMARY OF THE INVENTION

Therefore, the present invention has been made in view of the above problem, and it is an object of the present invention to provide a tracking error detector employing a phase difference detection method, in which a tracking error of a CD is detected on the basis of a 3-beam method and a tracking error of a DVD is detected on the basis of the phase difference detection method, so that a tracking servo operation can be performed according to the detected tracking errors.

In accordance with the present invention, the above and other objects can be accomplished by a provision of a tracking error detector employing a phase difference detection method, comprising a photo detector for generating four divided signals; a first adder for adding two of the four divided signals from the photo detector; a first comparator for comparing an output voltage from the first adder with a reference voltage; a first D flip-flop for providing first and second output signals synchronously with first and second output signals from the first comparator; a first OR gate for ORing the first and second output signals from the first D flip-flop; a second adder for adding the remaining two signals from the photo detector; a second comparator for comparing an output voltage from the second adder with the reference voltage; a second D flip-flop for providing first and second output signals synchronously with first and second output signals from the second comparator; a second OR gate for ORing the first and second output signals from the second D flip-flop; a third OR gate for ORing output signals from the first and second OR gates; a buffer for transferring the output signal from the first OR gate to its output terminal in response to an output signal from the third OR gate; an integrator for integrating a voltage signal from the buffer; a first switch being turned on in response to a digital video disk selection signal; and a second switch being turned on in response to a compact disk selection signal.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Figure 1:
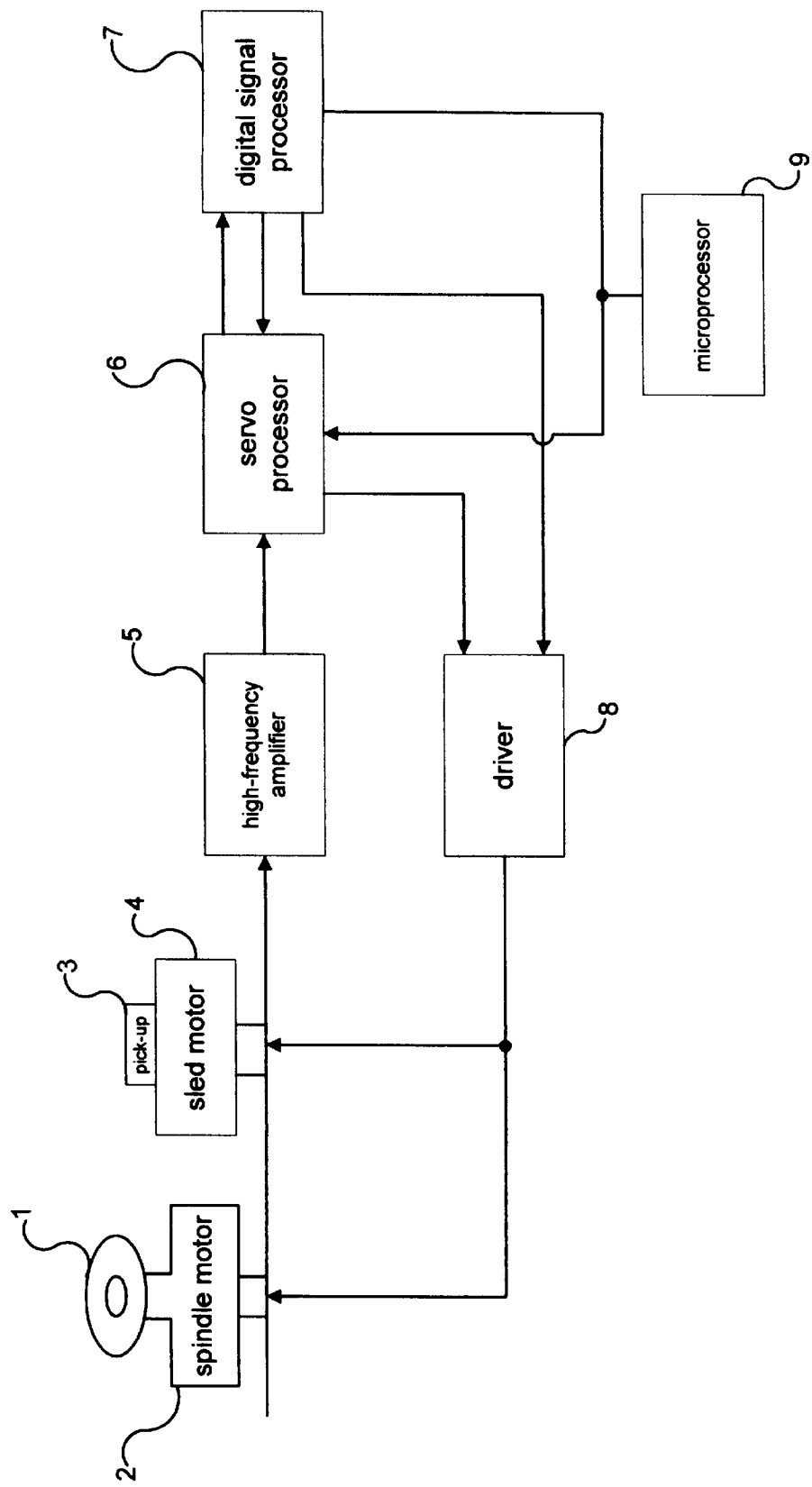
FIG. 1 is a functional block diagram illustrating the construction of a general CDP or DVDP.
Figure 2:
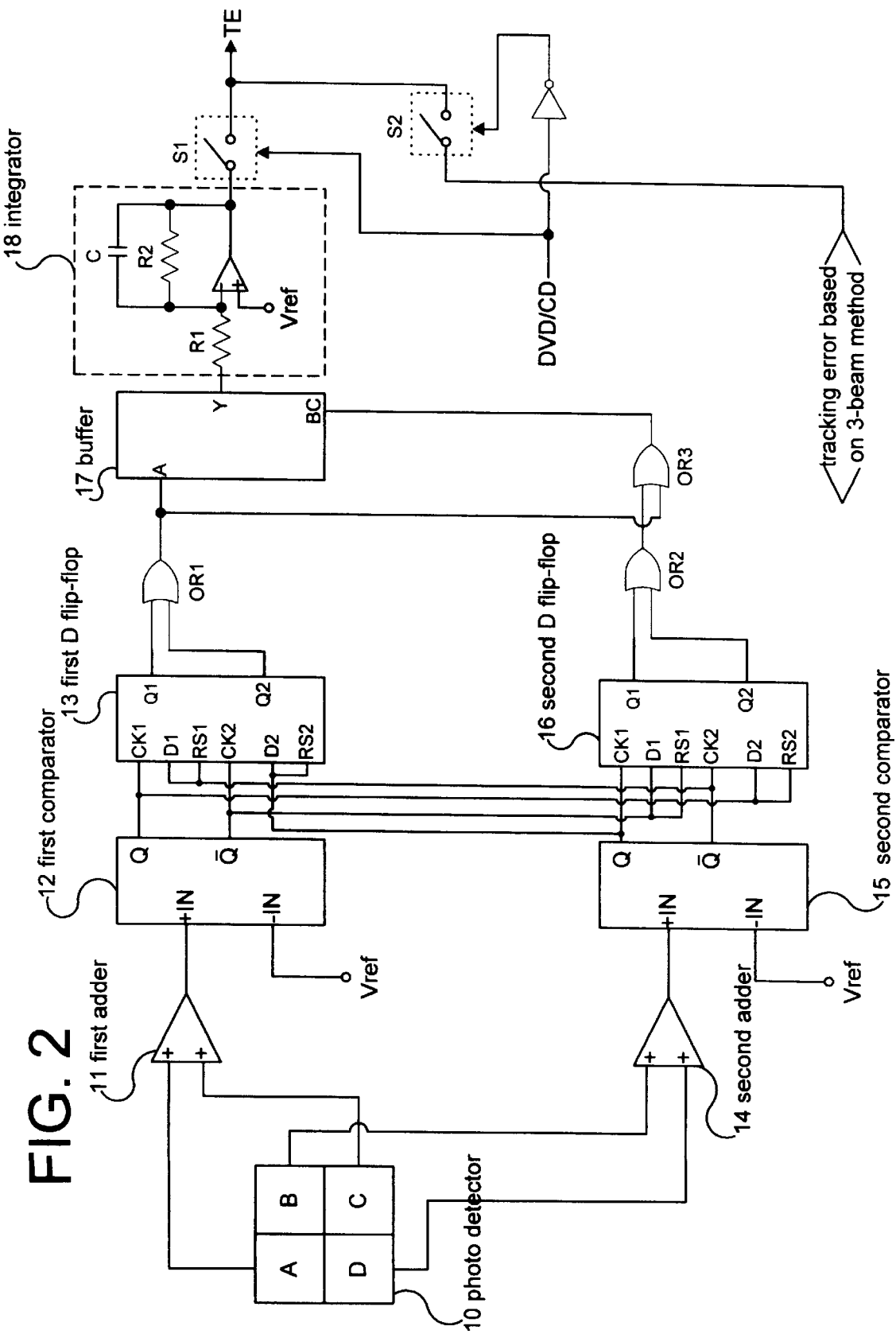
FIG. 2 is a circuit diagram illustrating the construction of a tracking error detector employing a phase difference detection method in accordance with the present invention.

FIG. 2 is a circuit diagram illustrating the construction of a tracking error detector employing a phase difference detection method in accordance with the present invention. As shown in this drawing, the tracking error detector comprises a photo detector 10, a first adder 11, a first comparator 12, a first D flip-flop 13, a second adder 14, a second comparator 15, a second D flip-flop 16, a buffer 17, an integrator 18, a first OR gate OR1, a second OR gate OR2, a third OR gate OR3, a first switch S1 and a second switch S2.

The photo detector 10 is adapted to detect whether a laser beam emitted to read information recorded on a CD or DVD is beyond the center of a track of the disk. As a result of the detection, the photo detector 10 generates four divided signals A to D.

The first adder 11 is adapted to add the output signals A and C from the photo detector 10 and output the added result (A+C).

The second adder 14 is adapted to add the output signals B and D from the photo detector 10 and output the added result (B+D).

The first comparator 12 is adapted to compare an output voltage from the first adder 11 with a reference voltage Vref. If the compared result indicates a high level, the first comparator 12 outputs a high level signal at its output terminal Q and a low level signal at its output terminal /Q. However, if the compared result indicates a low level, the first comparator 12 outputs a low level signal at its output terminal Q and a high level signal at its output terminal /Q.

The second comparator 15 is adapted to compare an output voltage from the second adder 14 with the reference voltage Vref. If the compared result indicates a high level, the second comparator 15 outputs a high level signal at its output terminal Q and a low level signal at its output terminal /Q. However, if the compared result indicates a low level, the second comparator 15 outputs a low level signal at its output terminal Q and a high level signal at its output terminal /Q.

The first D flip-flop 13 has its clock terminals CK1 and CK2 for receiving the output signals Q and /Q from the first comparator 12, respectively, its data and reset/set terminals D1 and RS1 for commonly receiving the output signal /Q from the second comparator 15, and its data and reset/set terminals D2 and RS2 for commonly receiving the output signal Q from the second comparator 15. When the output signal /Q from the second comparator 15 is low in level, the first D flip-flop 13 is reset to output a low level signal at its output terminal Q1. However, when the output signal Q from the second comparator 15 is low in level, the first D flip-flop 13 is reset to output a low level signal at its output terminal Q2. Further, in the case where the output signal /Q from the second comparator 15 is high in level and the output signal Q from the first comparator 12 is high in level, the first D flip-flop 13 outputs a high level signal at its output terminal Q1. However, in the case where the output signal Q from the second comparator 15 is high in level and the output signal /Q from the first comparator 12 is high in level, the first D flip-flop 13 outputs a high level signal at its output terminal Q2.

The second D flip-flop 16 has its clock terminals CK1 and CK2 for receiving the output signals Q and /Q from the second comparator 15, respectively, its data and reset/set terminals D1 and RS1 for commonly receiving the output signal /Q from the first comparator 12, and its data and reset/set terminals D2 and RS2 for commonly receiving the output signal Q from the first comparator 12. Similarly to the first D flip-flop 13, the second D flip-flop 16 outputs a high or low level signal at its output terminal Q1 or Q2 in response to the output signals Q and /Q from the first and second comparators 12 and 15.

The first OR gate OR1 is adapted to OR the output signals Q1 and Q2 from the first D flip-flop 13. When at least one of the output signals Q1 and Q2 from the first D flip-flop 13 is high in level, the first OR gate OR1 outputs a high level signal.

The second OR gate OR2 is adapted to OR the output signals Q1 and Q2 from the second D flip-flop 16. When at least one of the output signals Q1 and Q2 from the second D flip-flop 16 is high in level, the second OR gate OR2 outputs a high level signal.

The third OR gate OR3 is adapted to OR output signals from the first and second OR gates OR1 and OR2. When at least one of the output signals from the first and second OR gates OR1 and OR2 is high in level, the third OR gate OR3 outputs a high level signal.

The buffer 17 is adapted to output a high or low level signal in response to the output signal from the first OR gate OR1 and an output signal from the third OR gate OR3.

The integrator 18 is adapted to integrate a voltage signal from the buffer 17.

The first switch S1 is turned on in response to a DVD selection signal from a central processing unit (CPU), not shown.

The second switch S2 is turned on in response to a CD selection signal from the CPU.

The operation of the tracking error detector with the above-mentioned construction in accordance with the present invention will hereinafter be described in detail with reference to FIGS. 3a to 3o.

Figure 3:
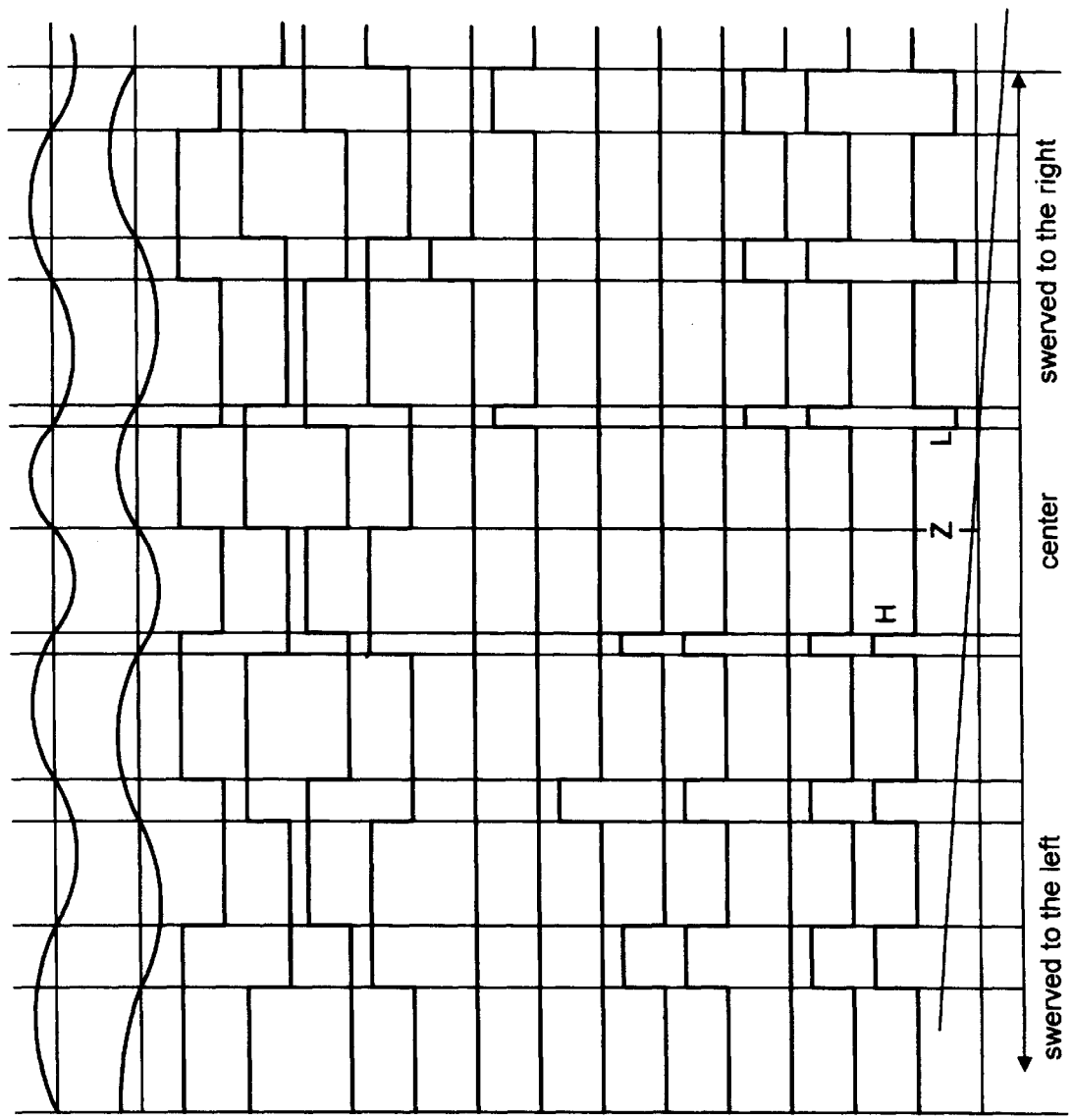
FIGS. 3a to 3o are timing diagrams illustrating the operation of the tracking error detector in FIG. 2.

FIGS. 3a to 3o are timing diagrams illustrating the operation of the tracking error detector in FIG. 2. First, the photo detector 10 detects whether the laser beam emitted to read the information recorded on the CD or DVD is beyond the center of the track of the disk. As a result of the detection, the photo detector 10 generates the four divided signals A to D. If the laser beam is swerved from the track center to the left, a sinusoidal wave signal as shown in FIG. 3a is outputted by the first adder 11. At this time, the added signal (B+D) is earlier in phase than the added signal (A+C), as shown in FIG. 3b. When the laser beam is positioned at the track center, the added signal (A+C) and the added signal (B+D) are the same in phase. However, in the case where the laser beam is swerved from the track center to the right, the added signal (A+C) is earlier in phase than the added signal (B+D). In result, a tracking error is detected on the basis of the four divided signals A to D from the photo detector 10.

In response to the output signal (A+C) from the first adder 11 as shown in FIG. 3a, the first comparator 12 outputs a square wave signal as shown in FIG. 3c at its output terminal Q and a square wave signal as shown in FIG. 3e at its output terminal /Q.

In the case where the laser beam is swerved from the track center to the left, the added signal (B+D) is earlier in phase than the added signal (A+C), as shown in FIG. 3b. In response to the output signal (B+D) from the second adder 14 as shown in FIG. 3b, the second comparator 15 outputs a square wave signal as shown in FIG. 3d at its output terminal Q and a square wave signal as shown in FIG. 3f at its output terminal /Q.

The square wave signals from the first and second comparators 12 and 15 are applied to the first and second D flip-flops 13 and 16. Generally, the D flip-flop has a clock terminal and an input terminal, and is a bistable trigger circuit for preventing an undecided state occuring when set and reset values are the same. Only when a clock pulse determining the operating time is applied to the clock terminal under the condition that an input is applied to the input terminal, the same output appears at the output terminals Q and /Q. The output signals Q and /Q from the first comparator 12 are applied respectively to the clock terminals CK1 and CK2 of the first D flip-flop 13, and the output signals Q and /Q from the second comparator 15 are applied respectively to the reset/set terminals RS2 and RS1 of the first D flip-flop 13. When the output signal /Q from the second comparator 15 is low in level, the first D flip-flop 13 is reset to output a low level signal at its output terminal Q1. However, when the output signal Q from the second comparator 15 is low in level, the first D flip-flop 13 is reset to output a low level signal at its output terminal Q2.

Further, in the case where the output signal /Q from the second comparator 15 (i.e., the signal at the data terminal D1 of the first flip-flop 13) is high in level and the output signal Q from the first comparator 12 (i.e., the signal at the clock terminal CK1 of the first flip-flop 13) is high in level, the first D flip-flop 13 outputs a square wave signal of high level as shown in FIG. 3g at its output terminal Q1. However, in the case where the output signal Q from the second comparator 15 (i.e., the signal at the data terminal D2 of the first flip-flop 13) is high in level and the output signal /Q from the first comparator 12 (i.e., the signal at the clock terminal CK2 of the first flip-flop 13) is high in level, the first D flip-flop 13 outputs a square wave signal of high level as shown in FIG. 3h at its output terminal Q2.

The output signals Q1 and Q2 from the first flip-flop 13 as shown in FIGS. 3g and 3h are ORed by the first OR gate OR1 which then outputs a square wave signal as shown in FIG. 3k. Similarly, the output signals Q1 and Q2 from the second flip-flop 16 are ORed by the second OR gate OR2 which then outputs a square wave signal as shown in FIG. 3l. The output signals from the first and second OR gates OR1 and OR2 as shown in FIGS. 3k and 3l are again ORed by the third OR gate OR3 which then outputs a square wave signal as shown in FIG. 3m.

The output signal from the first OR gate OR1 as shown in FIG. 3k is also applied to an input terminal A of the buffer 17. The output signal from the third OR gate OR3 as shown in FIG. 3m is applied to a control terminal BC of the buffer 17 to control the output of the buffer 17. If the output signal from the third OR gate OR3 as shown in FIG. 3m is high in level, the output signal from the first OR gate OR1 applied to the input terminal A of the buffer 17 is transferred directly to an output terminal Y of the buffer 17. However, when the output signal from the third OR gate OR3 as shown in FIG. 3m is low in level, the output terminal Y of the buffer 17 becomes a high impedance state. In this case, a signal at the output terminal Y of the buffer 17 has a waveform as shown in FIG. 3n.

The integrator 18 outputs a square wave signal as shown in FIG. 3o in response to the output signal Y from the buffer 17 as shown in FIG. 3n. When the output signal Y from the buffer 17 is high in level (i.e., when the laser beam is swerved from the track center to the left), the output signal from the integrator 18 is high in level. Also, when the laser beam is positioned at the track center, the output signal from the integrator 18 approximates zero. In the case where the output signal Y from the buffer 17 becomes low in level (i.e., when the laser beam is swerved from the track center to the right), the output signal from the integrator 18 becomes low in level. The tracking servo operation can be performed on the basis of such an output signal from the integrator 18.

Noticeably, a tracking error of the CD is detected on the basis of a 3-beam method and a tracking error of the DVD is detected on the basis of the phase difference detection method, so that the tracking servo operation can be performed according to the detected tracking errors. To this end, the CPU generates the DVD/CD selection signal to control the first and second switches S1 and S2. The first switch S1 is turned on to select the tracking error of the DVD, and the second switch S2 is turned on to select the tracking error of the CD.

As apparent from the above description, according to the present invention, the tracking error of the CD is detected on the basis of the 3-beam method and the tracking error of the DVD is detected on the basis of the phase difference detection method, so that the tracking servo operation can be performed according to the detected tracking errors. Therefore, the same pick-up can detect both the tracking errors of the CD and DVD with different signal characteristics.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A tracking error detector employing a phase difference detection method, comprising:

a photo detector for generating four divided signals;

a first adder for adding two of the four divided signals from said photo detector;

a first comparator for comparing an output voltage from said first adder with a reference voltage;

a first D flip-flop for providing first and second output signals synchronously with first and second output signals from said first comparator;

a first OR gate for ORing said first and second output signals from said first D flip-flop;

a second adder for adding the remaining two signals from said photo detector;

a second comparator for comparing an output voltage from said second adder with said reference voltage;

a second D flip-flop for providing first and second output signals synchronously with first and second output signals from said second comparator;

a second OR gate for ORing said first and second output signals from said second D flip-flop;

a third OR gate for ORing output signals from said first and second OR gates;

a buffer for transferring said output signal from said first OR gate to its output terminal in response to an output signal from said third OR gate;

an integrator for integrating a voltage signal from said buffer;

a first switch being turned on in response to a digital video disk selection signal; and a second switch being turned on in response to a compact disk selection signal.

2. A tracking error detector employing a phase difference detection method, as set forth in claim 1, wherein said first adder is adapted to add the first and third of the four divided signals from said photo detector.

3. A tracking error detector employing a phase difference detection method, as set forth in claim 1, wherein said second adder is adapted to add the second and fourth of the four divided signals from said photo detector.

4. A tracking error detector employing a phase difference detection method, as set forth in claim 1, wherein said first D flip-flop has first and second clock terminals for receiving said first and second output signals from said first comparator, respectively, first data and reset/set terminals for commonly receiving said second output signal from said second comparator, and second data and reset/set terminals for commonly receiving said first output signal from said second comparator.

5. A tracking error detector employing a phase difference detection method, as set forth in claim 1, wherein said second D flip-flop has first and second clock terminals for receiving said first and second output signals from said second comparator, respectively, first data and reset/set terminals for commonly receiving said second output signal from said first comparator, and second data and reset/set terminals for commonly receiving said first output signal from said first comparator.

* * * * *